(12) United States Patent
Wild

(10) Patent No.: US 6,909,277 B2
(45) Date of Patent: Jun. 21, 2005

(54) AMPLIFICATION CIRCUIT FOR INCREASING VARIABLE RELUCTANCE SENSOR OUTPUT

(75) Inventor: Arthur Wild, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/097,473

(22) Filed: Mar. 13, 2002

(65) Prior Publication Data

US 2003/0184282 A1 Oct. 2, 2003

(51) Int. Cl.[7] ............................................. G01P 3/54
(52) U.S. Cl. ................................................. 324/166
(58) Field of Search ................................. 307/491, 116; 324/207.12, 166, 160

(56) References Cited

U.S. PATENT DOCUMENTS

| | | | |
|---|---|---|---|
| 3,650,149 A | * | 3/1972 | Howes ........................ 73/117.3 |
| 4,866,298 A | | 9/1989 | Kniss et al. |
| 4,902,970 A | | 2/1990 | Suquet |
| 5,012,207 A | * | 4/1991 | Edwards ..................... 324/166 |
| 5,143,159 A | | 9/1992 | Young et al. |
| 5,144,233 A | | 9/1992 | Christenson et al. |
| 5,165,271 A | * | 11/1992 | Stepper et al. ................ 73/116 |
| 5,196,793 A | | 3/1993 | Good et al. |
| 5,352,938 A | * | 10/1994 | Wise et al. ................... 327/72 |
| 5,633,797 A | | 5/1997 | Hornback |
| 5,726,888 A | | 3/1998 | Hornback |
| 5,861,744 A | * | 1/1999 | Earl ........................... 324/166 |
| 6,094,044 A | | 7/2000 | Kustera et al. |
| 6,411,080 B1 | * | 6/2002 | Bach et al. ................. 324/173 |

* cited by examiner

*Primary Examiner*—N. Le
*Assistant Examiner*—Reena Aurora
(74) *Attorney, Agent, or Firm*—Kelsey L. Milman; Kevin C. Earle

(57) ABSTRACT

An apparatus and method for measuring a characteristic, such as speed, of a machine. A variable reluctance sensor (VRS) is coupled to a resistive element, which filters a portion of a basic output signal generated by the VRS having a frequency above a prescribed threshold level, thus removing high-frequency noise from the basic output signal. An amplifier amplifies the filtered output signal. The filtered, amplified output signal has an increased signal-to-noise ratio such that the machine characteristic, i.e. speed, can be more accurately measured during a slow speed operation. A controller generates a control signal received by a switching device to decouple the resistive element when machine speed exceeds a prescribed threshold level. Then, the basic output signal is used to measure the characteristic of the machine during normal machine operation.

27 Claims, 2 Drawing Sheets

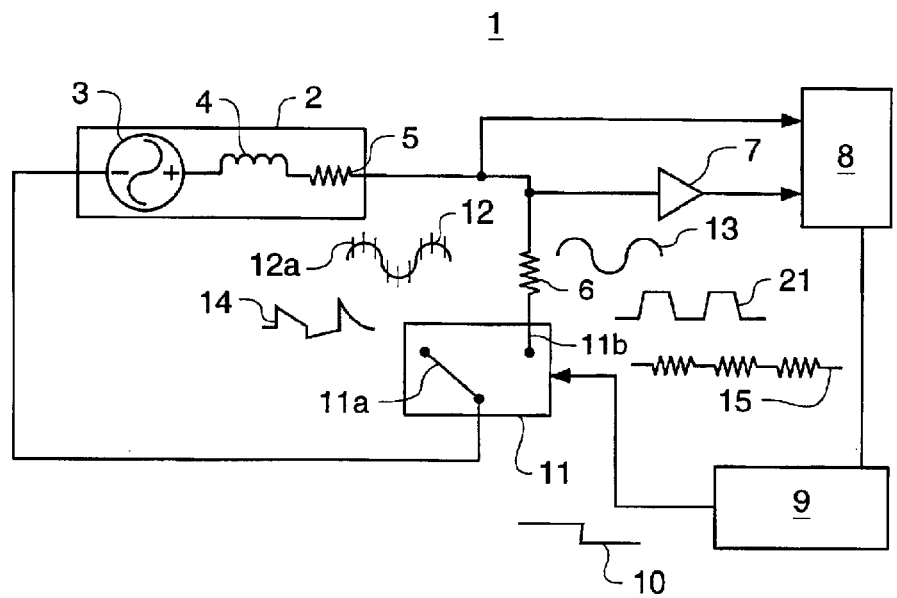
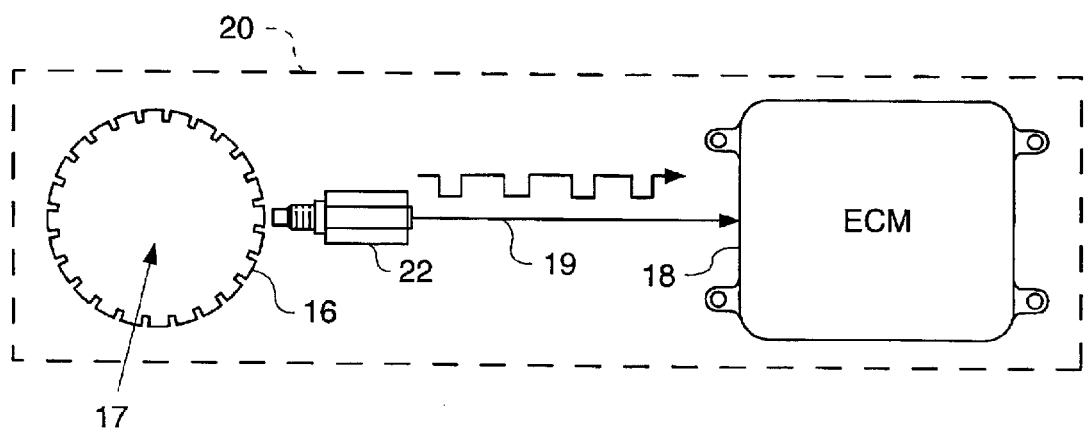

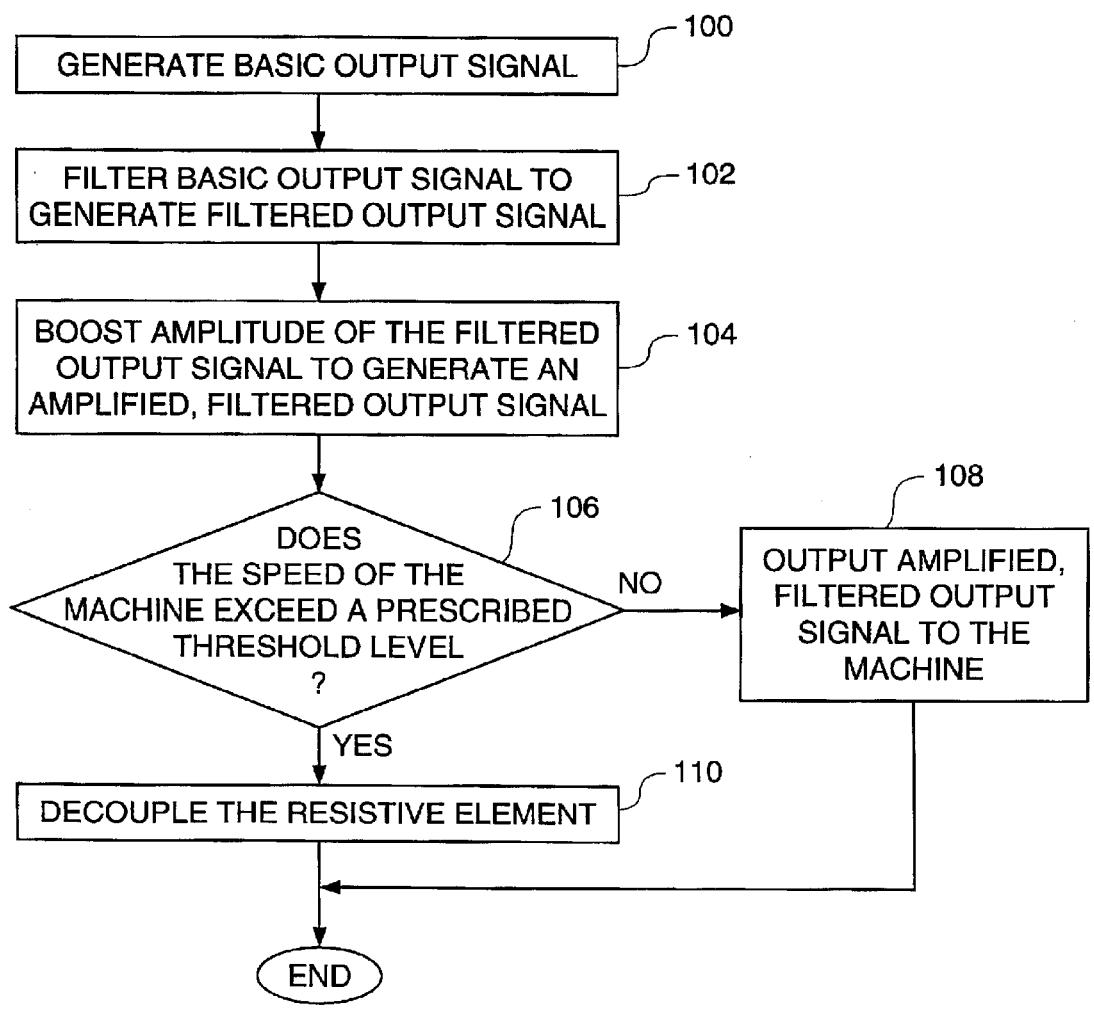

AMPLIFICATION CIRCUIT FOR INCREASING VARIABLE RELUCTANCE SENSOR OUTPUT

TECHNICAL FIELD

The present invention relates generally to a variable reluctance sensor (VRS) for use in a fuel combustion engine, and, more particularly, to a VRS that operates at low engine speed to more accurately detect gear tooth position and measure engine speed.

BACKGROUND

In the related art, a variable reluctance sensor (VRS) is described in U.S. Pat. No. 5,726,888, which discloses a method and system for testing a wheel speed sensor input circuit in an anti-braking system (ABS) and/or traction control (TC) system. Alternatively, a VRS, such as the VRS manufactured by Electro Corp., may be used to measure engine speed.

The conventional VRS is a coil of wire wrapped around a permanent magnet, with leads for connection into a circuit. Typically, the VRS is in the form of a head that is positioned adjacent a rotatable gear or the like. Thus, when the ferrous metal of a tooth of a gear moves past the sensor head, the magnetic field is altered, and a voltage is induced in the coil. The amplitude of the induced voltage can vary based on factors such as, for example, the gap between the VRS and the gear tooth and the speed at which the gear tooth passes the VRS.

As the metal of the gear tooth approaches the VRS, the voltage increases. When the center of the gear tooth passes across the VRS, however, the voltage equals zero; the voltage then reverses as the gear tooth moves away from the sensor. Accordingly, the voltage output of the VRS appears as a sinusoidal wave, and points at which the wave crosses zero volts from a peak voltage represent the points at which the center of the gear tooth passes the VRS. A comparator is used to determine whether a logic condition of 0 (conventionally, when the VRS output voltage is 0V) or 1 exists (conventionally, when there is a VRS output voltage greater than zero, e.g., 0.5V during a start-up phase of engine operation). Typically, the portion of the sinusoidal wave that is less than zero is not used by the VRS.

However, the related art VRS has various problems and disadvantages. For example, but not by way of limitation, during low-voltage operation periods such as engine startup, VRS output voltage is relatively low (i.e., about 0.5V) due to the slow speed at which the gear teeth pass the VRS, and the zero-crossing voltage is approximately 0.1V. Typically, there is substantial high-frequency electrical noise produced by other engine components (e.g., firing injectors or local power supplies on board the engine). Thus, at low speeds, there is a low signal-to-noise ratio, and the voltages induced by the high-frequency noise sources will interfere with the operation of the VRS. As a result, engine speed cannot be monitored in an accurate manner during the startup period and during other low operating speed periods. However, once typical engine speed is reached, the VRS output voltage increases to much higher levels (e.g., about 22 volts); thus, the signal-to-noise ratio increases sufficiently such that engine characteristics (e.g., engine speed) can be accurately measured.

The present invention is directed to overcoming one or more of the problems as set forth above.

SUMMARY OF THE INVENTION

In an embodiment of the present invention, there is provided an apparatus that measures a characteristic of a machine, comprising a variable reluctance sensor (VRS) coupled to the machine and operative to generate a basic output signal having a basic frequency representative of the characteristic. The apparatus also includes a resistive element electrically coupled to the VRS and operative to filter a portion of the basic output signal having a frequency at a prescribed level, the resistive element generating a filtered output signal.

Additionally, in accordance with an embodiment of the present invention, there is provided a method of measuring a characteristic of a machine having a variable reluctance sensor (VRS), comprising the steps of (a) generating a basic output signal from the VRS, the signal having a basic frequency representative of the characteristic, and (b) filtering the basic output signal to remove a portion of the basic output signal having a frequency at a prescribed level and generate a filtered output signal.

Further, in accordance with an embodiment of the present invention, there is provided a machine system, comprising a machine having a camshaft with a speed wheel mounted thereto, the speed wheel including at least one gear tooth and a sensing system electrically coupled to the machine. The sensing system includes a variable reluctance sensor (VRS) adapted to detect a position of the gear tooth and to generate a basic output signal having a frequency representative of the position, a resistive element electrically coupled to the VRS and operative to filter electrical noise having a prescribed frequency level from the basic output signal to generate a filtered output signal, and an amplifier coupled to the resistive element and adapted to boost an amplitude of the filtered output signal and generate an amplified, filtered output signal.

BRIEF DESCRIPTION OF THE DRAWINGS

For a better understanding of the present invention, reference may be made to the accompanying drawings in which:

FIG. 1 is a schematic diagram of an exemplary embodiment of the present invention;

FIG. 2 is a diagram of an industrial application of an engine system that includes an exemplary embodiment of the present invention; and FIG. 3 is a flowchart illustrating of an examplary embodiment of the present invention.

DETAILED DESCRIPTION

An exemplary embodiment of the present invention provides an apparatus and method of accurately sensing machine characteristics during a start-up phase of a machine and during normal operation of the machine. The following description uses a vehicle engine as an example only. As would be understood by one skilled in the art, this invention also is applicable to other types of machines having a rotating member.

FIG. 1 illustrates a schematic diagram of an apparatus as represented by a circuit 1 that measures a characteristic of a machine. The circuit 1 may be coupled to the machine, or it may be incorporated into the machine. The circuit 1 includes a variable reluctance sensor (VRS) 2. The VRS 2 generates a basic output signal 12 having a basic frequency that is representative of the characteristic of the machine. While the VRS 2 is preferably implemented as a single fine-wire coiled about a magnetic structure (e.g., permanent magnet), the circuit 1 illustrates the VRS 2 as a reactance circuit that can generate a voltage 3 and includes an inductor 4 electrically coupled in series to a resistor 5, solely as a representation of the electrical properties of the VRS 2.

A resistive element 6 is coupled to the VRS 2 and is operative to generate a filtered output signal 13 by rejecting a portion of the basic output signal 12 that has a frequency at a prescribed level. The prescribed level is in a subset of frequencies greater than the basic output frequency and is determined based on a combination of the inductance 4 of the VRS 2 and a resistance of the resistive element 6.

Advantageously, an amplifier 7, coupled to the resistive element 6 and the VRS 2, is provided and is operative to boost an amplitude of a signal.

The amplifier 7 may amplify the filtered output signal 13, generating an amplified, filtered output signal 21. In the alternative, the amplifier 7 may generate an amplified version of the basic output signal 12.

A multiplexer 8 is coupled between the VRS 2 and the resistive element 6 and a controller 9. The multiplexer 8 receives two input signals and produces one output signal which is received by the controller 9.

The controller 9 produces a control signal 10 preferably based on an output of a hardware device and/or a software system and is coupled to a switching device 11 that receives the control signal 10. The switching device 11 is operative, based on the control signal 10, in a first position 11a to decouple the resistive element 6 and in a second position 11b to engage the resistive element 6, thus enabling generation of the filtered output signal 13. When the resistive element 6 is decoupled, the basic output signal 12 is not filtered, and generation of the filtered output signal 13 is prevented.

It is preferable that the inductance 4 of the VRS 2 is about 55 milliHenries and the resistance 5 of the VRS 2 is about 155 ohms. Further, it is preferable that the resistance of the resistive element is about 10 ohms and the gain of the amplifier is about 165. However, the present invention is not limited to those values, which are provided as an exemplary description of the present invention. It is preferred that the filtered output signal 13 is indicative of a current of the basic output signal 12, based on the resistive element 6.

Advantageously, the machine is an engine, and in an exemplary embodiment, a characteristic of the machine that is measured includes engine speed. The above-discussed embodiment of the present invention is designed to allow for more accurate measurement of a machine characteristic during the machine startup process and to continue to allow for measurement of the machine characteristic during normal machine operation. Thus, the machine characteristic may be measured by the circuit 1 when the VRS output voltage is low (e.g. about 0.5V). Once the VRS output voltage exceeds a threshold voltage (e.g., about 20V) that corresponds to a prescribed threshold machine speed, the signal-to-noise ratio increases substantially, and the circuit 1 is modified to continue to measure the machine characteristic.

Advantageously, the controller 9 measures a speed-related parameter of the machine and generates control signal 10 whenever the speed-related parameter exceeds the prescribed threshold level. Control signal 10 indicates to the switching device 11 whether the machine speed is above or below the prescribed threshold; thus, at normal operating speed (i.e. when the control signal indicates the VRS output voltage exceeds the threshold), the switching device 11 is operative in the first position 11a to decouple the resistive element 6 and, at low operating speed (i.e. when the control signal indicates the VRS output voltage is below the threshold level), the switching device 11 is operative in the second position 11b to engage the resistive element 6 and enable generation of the filtered output signal 13. Further, during both modes of operation, the amplifier 7 remains coupled.

As indicated above, the basic output signal 12 is an output of the VRS 2 and is a sinusoidal wave. The apparent "hairs" on the basic output signal 12 are high frequency noise pulses 12a that represent machine (e.g., firing injector) noise and are very narrow and very large in magnitude. The high frequency noise pulses 12a do not appear in the filtered output signal 13 due to their being filtered out by the resistive element 6.

The filtered output signal 13 is boosted by the amplifier 7 to generate the amplified, filtered output signal 21. As the amplified, filtered output signal 21 starts to rise from zero, a rising linear output is shown. Because the amplified, filtered output signal 21 has a voltage higher than the supply voltage, the amplified, filtered output signal 21 reaches a level greater than the supply voltage and stops rising at a supply rail, as represented by the horizontal portion of the amplified, filtered output signal 21. Similarly, when the sinusoidal wave is negative and goes below the negative supply voltage, another supply rail is reached, and a corresponding horizontal output is generated.

Further, the electrical noise output 14 illustrated in FIG. 1 is a snapshot of electrical noise at a point where the sinusoidal wave is zero volts and the related art noise problem is most destructive. However, the filtered electrical noise output 15 shows that the amplitude of the noise is substantially reduced, which results in the filtered output signal 13 not having any substantial electrical noise that can interfere with measurement of the machine characteristics.

The multiplexer 8 receives first and second signals, with the first signal being basic output signal 12. The second signal received by the multiplexer 8 depends on the status of the resistive element 6. If the resistive element 6 is decoupled by the switching device 11 and the machine is at normal operating speed, the second signal is signal 12. During the low speed of operation, when the resistive element 6 is engaged, the second signal received by the multiplexer 8 is the amplified filtered output signal 13.

Based on the speed of the machine, the controller 9 instructs the multiplexer 8 to transmit either the first signal, i.e. the basic output signal 12, or the second signal, i.e. either the amplified filtered output signal 13 to the controller 9. For example, if the controller 9 determines that the machine 20 is operating at the normal speed, the controller 9 receives the first, or basic output, signal 12 from the multiplexer 8. However, if the controller 9 determines that the machine 20 is in the low speed mode of operation, the controller 9 receives the second signal, which in this case is the amplified filtered output signal 13, from the multiplexer 8. Thus, the multiplexer 8 sends the appropriate signal on the basis of the measurement made by the controller 9.

FIG. 2 illustrates an application of an embodiment of the present invention. An engine 20 comprises a measurement device 22 incorporating at least the VRS 2. The device 22 may also incorporate the remainder of circuit 1.

The measurement device 22 is operative to measure a position of a gear tooth 16 located on a camshaft-mounted speed wheel 17. The output frequency of the measurement device 22 is indicative of the gear tooth 16 passing across the measurement device 22. The measurement device 22 generates a square wave pulsed output to an electronic control module (ECM) 18, which alternatively may include the remainder of the circuit 1, and is coupled to the measurement device 22 via a wire 19. In the engine 20 operation, the ECM 18 also typically performs various normal functions, including (but not limited to): interpreting the speed wheel pulses, determining the timing and duration, firing an injector solenoid, and controlling rail pressure. The measurement device 22 determines the location of the gear tooth 16 on the speed wheel 17 that is mounted on the camshaft of the engine 20. As a result, the EMC 18 can measure the speed of the camshaft. Accordingly, the present invention includes, but is not limited to, a machine having a start-up phase during which machine speed is low, such as an internal combustion engine that uses a fuel of the gasoline or diesel type. The measurement device 22 measures the speed of the engine throughout its operation, and the preferred embodiment of the present invention measures engine speed during the start-up phase. The system illustrated in FIG. 2 is preferably in an engine of a vehicle.

In addition to the aforementioned apparatus, a method, as seen in FIG. 3, of implementing an embodiment of the present invention is also provided. In the first control block 100, the basic output signal 12 is generated from the VRS 2, having a basic output signal frequency that is representative of a characteristic of the machine. In control block 102, the basic output signal 12 is filtered, and, based on the inductance of the VRS 2 and the resistance of the resistive element 6, the filtered output signal 13 is generated. The filtered output signal 13 does not include a prescribed portion of the basic output signal 12 having a frequency at a prescribed threshold level (e.g., greater than the frequency of the basic signal output). The prescribed portion is selected from a subset of frequencies that are greater than the basic output signal frequency.

Advantageously, in control block 104, an amplitude of the filtered output signal 13 is boosted by an amplifier 7 to generate an amplified, filtered output signal 21. Then, as seen in control blocks 106 and 108, whenever a speed of the machine 20 does not exceed a prescribed threshold level, the amplified, filtered output signal 21 is output to the machine 20. Alternatively, the basic output signal 12 is output to the machine whenever the machine speed exceeds the prescribed threshold level.

Preferably, the filtered output signal 13 represents a current of the basic output signal 12, due to the measurement being taken across the resistive element 6. Further, a position of the gear tooth 16 on the camshaft-mounted speed wheel 17 can be measured with the VRS 2.

When the speed of the machine 20 exceeds the prescribed threshold level, as seen in control block 110, it is also preferable to decouple the resistive element 6. Further, it is advantageous that the decoupling step further include generating the control signal 10 in the controller 9 when the machine speed exceeds the prescribed threshold level and then switching between a first condition that bypasses the filtering step (e.g., normal operating speed) and a second position that performs the filtering step (i.e., the resistive element 6 is engaged and is filtering the basic output signal 12 to generate the filtered output signal 13), in accordance with the control signal. As a result, the resistive element 6 is decoupled, and the basic output signal 12 is not filtered to generate the filtered output signal 13 and the corresponding amplified, filtered output signal 21.

Industrial Applicability

An embodiment of the present invention allows a machine characteristic, preferably engine speed, to be measured under various conditions, such as during initial start-up and during normal operation. Preferably, as seen in FIG. 2, the measurement device 22 incorporating at least the VRS 2 is placed in proximity to a speed wheel 17 mounted on the camshaft of an engine 20, such that the VRS 2 may measure when a gear tooth 16 on the speed wheel 17 passes by as the camshaft rotates.

When the camshaft is rotating slowly, such as during initial start-up of the engine 20, the VRS 2 produces a relatively low output voltage, i.e., the basic output signal 12, such as for example about 0.5V. This voltage is low relative to the electrical noise in the engine 20 such that the ECM 18 is unable to accurately measure the engine speed. Thus, when the controller 9 receives the output voltage, it determines that the voltage is less than the prescribed threshold voltage, which may be defined as 20V for example. The controller 9 sends control signal 10 to the switching device 11 to position the switching device 11 into the second position 11*b* and engage the resistive element 6. The resistive element 6 produces the filtered output signal 13 which is relayed to the amplifier 7 which, in turn, produces the amplified, filtered output signal 21. The VRS output signal 12 and the amplified, filtered output signal 21 are relayed to the multiplexer 8. Based upon the basic output signal 12 being below the prescribed threshold value, the multiplexer 8 relays the second signal, i.e. the amplified, filtered output signal 21, to the controller 9, which relays the output signal 21 to the ECM 18. This output signal 21, having the engine noise filtered out, allows the ECM 18 to determine engine speed at low speed operating conditions.

When the basic output signal 12 increases above the prescribed threshold level, the resistive element 6 is decoupled, and the basic output signal 12 is relayed to the controller 9 and the ECM 18. At this point the signal 12 is sufficiently high (e.g. 22V) such that the engine noise is insignificant and no filtering is necessary.

It should be understood that while a preferred embodiment is described in connection with a vehicular engine, the present invention is readily adaptable to provide similar functions for other machines. Other aspects, objects and advantages of the present invention can be obtained from a study of the drawings, the disclosure and the appended claims.

While aspects of the present invention have been particularly shown and described with reference to the preferred embodiment above, it will be understood by those skilled in the art that various additional embodiments may be contemplated without departing from the spirit and scope of the present invention. However, a device or method incorporating such an embodiment should be understood to fall within the scope of the present invention as determined based upon the claims and any equivalents thereof.

What is claimed is:

1. An apparatus that measures a characteristic of a machine, comprising:

a variable reluctance sensor (VRS) coupled to said machine and operative to generate a basic output signal having a basic frequency representative of said characteristic;

a resistive element electrically coupled to said VRS and operative to filter a portion of said basic output signal having a frequency at a prescribed level, said resistive element in combination with an inductance of said VRS generating a filtered output signal, wherein said filtered output signal is indicative of a current produced by said basic output signal; and a controller coupled to said VRS and operative to determine said characteristic and decouple said resistive element when said characteristic exceeds a prescribed threshold level.

2. The apparatus, as set forth in claim 1, wherein said VRS includes a coil of wire wrapped around a magnetic structure, said VRS adapted to generate a voltage and having inductive and resistive properties.

3. The apparatus, as set forth in claim 1, wherein said prescribed level is determined in accordance with a resistance of said resistive element and an inductance of said VRS.

4. The apparatus, as set forth in claim 1, further including an amplifier coupled to said resistive element, said amplifier operative to boost an amplitude of said filtered output signal, to output an amplified, filtered output signal.

5. The apparatus, as set forth in claim 4, wherein said VRS has an inductance of 55 milliHenries and a resistance of 155 ohms, said resistive element has a resistance of 10 ohms, and said amplifier has a gain of 165.

6. The apparatus, as set forth in claim 1,
wherein said machine is an engine having a camshaft,
wherein said VRS is operative to measure a position of a gear tooth on a camshaft-mounted speed wheel, and
wherein said characteristic relates to engine speed.

7. The apparatus, as set forth in claim 1,
wherein said controller is operative to measure a speed-related parameter of said machine and generate a control signal when said speed-related parameter exceeds a prescribed threshold level, the apparatus further including:
a switching device operative to receive said control signal and to move between at least a first position and a second position based on said control signal,
wherein in said first position said resistive element is decoupled, and
wherein in said second position said resistive element is engaged.

8. The apparatus, as set forth in claim 7, wherein said controller generates said control signal based on an output of at least one of a hardware device and a software system.

9. The apparatus, as set forth in claim 7, further including a multiplexer coupled to said controller and operative to receive said basic output signal and said filtered output signal, and operative to output one of said basic output signal and said filtered output signal to said controller in accordance with said speed-related parameter.

10. The apparatus, as set forth in claim 9, further including an amplifier coupled between said resistive element and said multiplexer, said amplifier operative to boost an amplitude of said filtered output signal to be received by said multiplexer.

11. A method of measuring a characteristic of a machine having a variable reluctance sensor (VRS), comprising:
generating a basic output signal from said VRS electrically coupled to a resistive element, said signal having a basic frequency representative of said characteristic;
filtering said basic output signal to remove a portion of said basic output signal having a frequency at a prescribed level, said resistive element in combination with an inductance of said VHS to generate a filtered output signal; and
decoupling said resistive element when said characteristic exceeds a prescribed threshold level:
wherein said filtered output signal represents a current produced by said basic output signal.

12. The method, as set forth in claim 11, further including:
boosting an amplitude of said filtered output signal to generate an amplified, filtered output signal; and
outputting one of: (a) said amplified, filtered output signal whenever a speed of said machine does not exceed a prescribed threshold level, and (b) said basic output signal whenever said speed exceeds said prescribed threshold level.

13. The method, as set forth in claim 11, further including:
determining said prescribed level based on an inductance of said VRS and a resistance of a resistive element.

14. The method, as set forth in claim 13, further including:
outputting one of: (a) said amplified, filtered output signal whenever a speed of said machine does not exceed a prescribed threshold level, and (b) said basic output signal whenever said speed exceeds said prescribed threshold level.

15. The method, as set forth in claim 14, further including:
generating a control signal in a controller when said speed exceeds said prescribed threshold level; and
switching, based upon said control signal, between a first position that bypasses said filtering step and a second position that performs said filtering step.

16. A machine system, comprising:
a machine having a camshaft with a speed wheel mounted thereon, said speed wheel including at least one gear tooth; and
a sensing system electrically coupled to said machine, said sensing system comprising:
a variable reluctance sensor (VRS) adapted to detect a position of said gear tooth and to generate a basic output signal having a frequency representative of said positions;
a resistive element electrically coupled to said VRS and operative to filter electrical noise having a prescribed frequency level from said basic output signal, to generate a filtered output signal;
an amplifier coupled to said resistive element and adapted to boost an amplitude of said filtered output signal and generate an amplified, filtered output signal;
a controller operative to measure a speed-related parameter of said machine and generate a control signal when said speed exceeds a prescribed threshold level; and
a switching device operative to receive said control signal and to move between at least a first position and a second position based on said control signal,
wherein in said first position said resistive element is decoupled, and
wherein in said second position said resistive element is engaged.

17. The system, as set forth in claim 16, further including an electronic control module (ECM) housing said resistive element and said amplification device and electrically coupled between said sensing system and said machine, wherein said ECM interprets an output of said sensing system.

18. An apparatus that measures a characteristic of a machine, comprising:
a variable reluctance sensor (VRS) coupled to said machine and operative to generate a basic output signal having a basic frequency representative of said characteristic; and
a resistive element electrically coupled to said VRS and operative to filter a portion of said basic output signal having a frequency at a prescribed level, said resistive element generating a filtered output signal;
a controller coupled to said VRS and operative to measure a speed-related parameter of said machine and generate a control signal when said speed-related parameter exceeds a prescribed threshold level; and a switching device operative to receive said control signal and to move between at least a first position and a second position based on said control signal, wherein in said first position said resistive element is decoupled, and wherein in said second position said resistive element is engaged.

19. The apparatus, as set forth in claim 18, wherein said controller generates said control signal based on an output of at least one of a hardware device and a software system.

20. The apparatus, as set forth in claim 18, further including a multiplexer coupled to said controller and operative to receive said basic output signal and said filtered output signal, and operative to output one of said basic output signal and said filtered output signal to said controller in accordance with said speed-related parameter.

21. The apparatus, as set forth in claim 20, further including an amplifier coupled between said resistive element and said multiplexer, said amplifier operative to boost an amplitude of said filtered output signal to be received by said multiplexer.

22. A method of measuring a characteristic of a machine having a variable reluctance sensor (VRS), comprising:

generating a basic output signal from said VRS, said signal having a basic frequency representative of said characteristic;

filtering said basic output signal to remove a portion of said basic output signal having a frequency at a prescribed level and to generate a filtered output signal, wherein said filtered output signal represents a current of said basic output signal determining said prescribed level based on an inductance of said VRS and a resistive element; and outputting one of: (a) said amplified, filtered output signal whenever a speed of said machine does not exceed a prescribed threshold level, and (b) said basic output signal whenever said speed exceeds said prescribed threshold level.

23. The method, as set forth in claim 22, further including:

generating a control signal in a controller when said speed exceeds said prescribed threshold level; and switching, based upon said control signal, between a first position that bypasses said filtering step and a second position that performs said filtering step.

24. The method, as set forth in claim 22, further including:

decoupling said resistive element when a speed of said machine exceeds a prescribed threshold level.

25. The method, as set forth in claim 24, said decoupling further including:

generating a control signal in a controlLer when said speed exceeds said prescribed threshold level; and switching, based upon said control signal, between a first position that bypasses said filtering step and a second position that performs said filtering step.

26. An apparatus that measures a characteristic of a machine, comprising:

a variable reluctance sensor (VRS) coupled to said machine and operative to generate a basic output signal having a basic frequency representative of said characteristic, said variable reluctance sensor having an inductance; and a resistive element electrically coupled to said VRS and operative with said inductance to filter a portion of said basic output signal having a frequency at a prescribed level, said resistive element generating a filtered output signal and a controller coupled to said VRS and operative to determine said characteristic and decouple said resistive element when said characteristic exceeds a prescribed threshold level.

27. An apparatus, as set forth in claim 26, wherein said filtered output signal is undelayed.

* * * * *

UNITED STATES PATENT AND TRADEMARK OFFICE
CERTIFICATE OF CORRECTION

PATENT NO. : 6,909,277 B2
DATED : June 21, 2005
INVENTOR(S) : Arthur Wild

It is certified that error appears in the above-identified patent and that said Letters Patent is hereby corrected as shown below:

Column 7,
Line 55, delete "VHS" and insert -- VRS --.

Signed and Sealed this

Twenty-second Day of November, 2005

JON W. DUDAS
*Director of the United States Patent and Trademark Office*